UNITED STATES PATENT OFFICE.

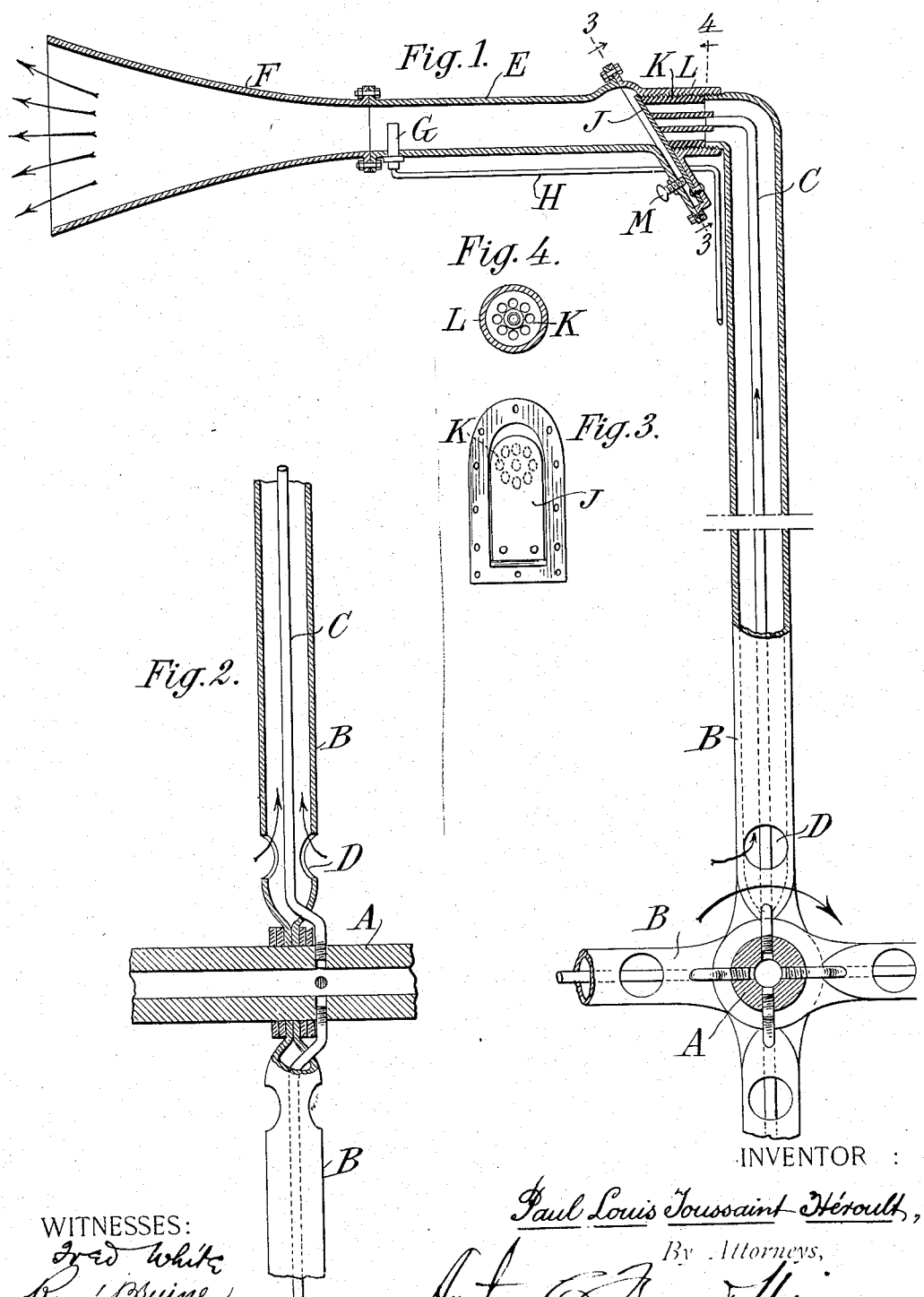

PAUL LOUIS TOUSSAINT HÉROULT, OF LA PRAZ, FRANCE.

MOTOR.

1,021,521.      Specification of Letters Patent.      Patented Mar. 26, 1912.

Application filed November 29, 1909. Serial No. 530,525.

*To all whom it may concern:*

Be it known that I, PAUL LOUIS TOUSSAINT HÉROULT, a citizen of the Republic of France, residing in La Praz, Savoy, France, have invented certain new and useful Improvements in Motors, of which the following is a specification.

This invention aims to provide an improved motor of the reaction type operated by the expanding combustion gases of a mixture of hydrocarbon or other combustible and air or oxygen in other forms.

The apparatus is adapted for use in large stationary units driving heavy loads, or in connection with aeroplanes, air-ships or the like, where lightness in proportion to the power developed is of great importance, and where it is desirable to have as few moving parts to the engine as possible; and is adapted for use in various other fields.

The accompanying drawings illustrate embodiments of the invention.

Figure 5:
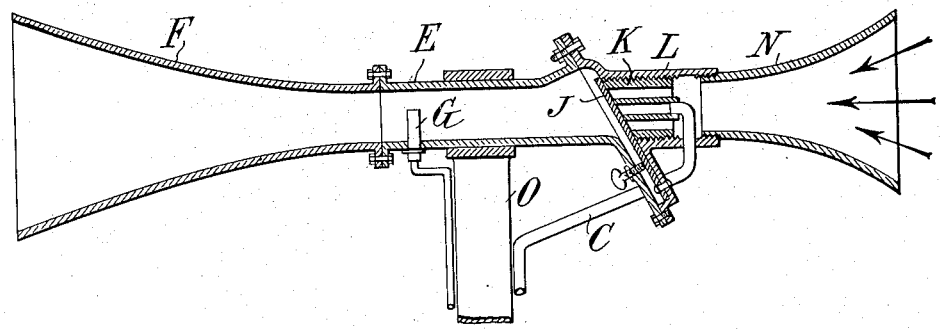
Figure 6:
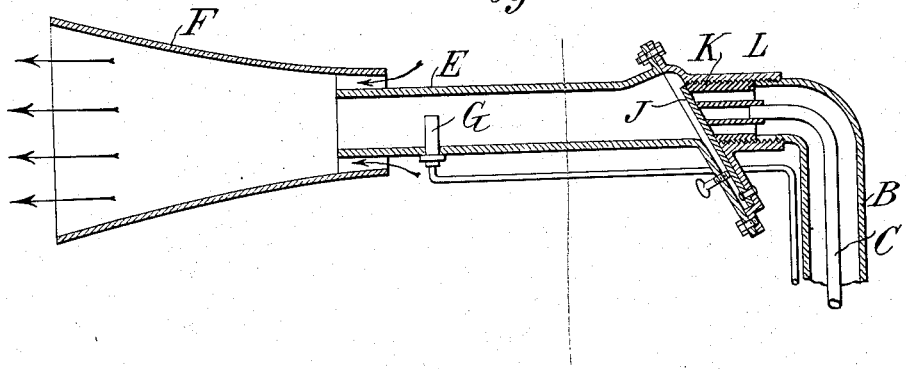

Figure 1 is a vertical section, partly in elevation, of one arm of the improved motor, the section being transverse to the shaft; Fig. 2 is an axial section of the central parts of the motor; Fig. 3 is a transverse section of the combustion chamber on the line 3—3 of Fig. 1; Fig. 4 is a section on the line 4—4 of Fig. 1; Figs. 5 and 6 are sections similar to Fig. 1 of the outer end of an arm of the motor, illustrating other embodiments of the invention.

Referring to the embodiment of the invention illustrated, the shaft A is mounted in any suitable bearings and provided with end connections through which a supply of acetylene, gasolene, or other combustible (preferably under pressure) is passed through the hollow center of the shaft. Mounted on the shaft are one or more tubular members D, preferably two or more arranged to balance each other. They may be braced, and mounted on the shaft in any suitable way. A passage is provided from the center to the outer end of the arm, preferably by making the arm itself in the form of a tube as shown. In this passage is located a pipe C communicating at its inner end with the supply of hydrocarbon, and extending to the outer end of the passage. The tubular arms B are provided also near the center with openings D through which air is drawn in by centrifugal force as the motor is rotated. At the outer end of the pipe C the combustible therein is mixed with the air carried in the outer tube B, and the mixture is ignited. The combustion gases pass out to the rear in a tangential direction and give a forward impetus to the motor. The mixing chamber and combustion chamber are preferably united into one or into a continuation one of the other, and are combined with an expansion chamber in a tubular casing arranged tangentially and preferably at about a right angle to the tube B.

The tangential part of the casing may for example be composed of a cylindrical portion E in which the gases are mixed and ignited, and a flaring portion F in which the combustion gases are expanded. The gases are mixed in the first part of the tube E, and are carried along, expelling the burned gases of the previous explosion, until they reach an igniter G, when the new mixture is in turn exploded. The combustion gases then react to drive the motor forward, and at the same time are expanded in the direction of the arrows to escape from the rear end of the flaring nozzle F. The flaring of this nozzle will be preferably designed for the greatest efficiency in accordance with the mixture, its expansion, and the rapidity with which it burns; and will vary considerably in order to secure the maximum efficiency in motors designed for different combustibles and pressures. The flare serves to cool the gases by expansion and diminishes the velocity of discharge to the point of greatest efficiency.

The igniter may be of any suitable type, an incandescent igniter being indicated, the connecting tube H of which runs to any suitable source of heat. After being once heated it remains at a white heat as long as the supply of the mixture continues.

In order to utilize, in rotating the motor, only the expansive force of the gases of combustion, and to prevent the air and combustible from being forced wastefully through the trumpet before they can be burned by reason of the centrifugal force with which they are fed to the outer end of the arm, a valve is provided which limits the escape of the air and combustible. Preferably this valve works automatically and intermittently to alternately supply a quantity of the mixture and cut off further supply until the previous charge has practically spent its force. Such a valve is shown by way of example as a flat spring J fastened at one end and having its free end bearing against a valve seat K consisting of a plug fitting the adjacent portion L of the tube, and provided with a number of perforations, one or more of which is connected with the hydrocarbon pipe C and the others of which communicate with the air pipe B. The valve J may be adjusted by a screw M to bear against its seat with suitable pressure. Space is left around the edge of the valve for the escape of the air and combustible into the mixing chamber in the tube E at the opposite end of which is located the igniter.

The valve may be arranged obliquely as shown, because in this position it tends to automatically regulate the speed of rotation. The higher the centrifugal force the more the valve tends to assume a radial position and the greater the pressure with which it resists the tendency of the air and hydrocarbon to escape; thus tending to balance the increase in the pressure of the air and combustible due to the increased centrifugal force and higher speed.

In operation, the igniter being made incandescent and the motor started in any suitable way, the air and combustible are fed outward by centrifugal force and press down the valve so that they escape into the mixing chamber. When they reach the end of this mixing chamber they are sufficiently mixed and are exploded by the igniter. A back pressure immediately occurs upon the valve which shuts off, for the instant, the escape of more combustible and air. The burned gases escape through the flared nozzle and drive the motor as described. When the pressure in the mixing chamber is relieved, the valve yields to permit the escape of a further supply of the mixture, which drives the spent gases before it and repeats the operation. The speed is such that the apparatus, rotating in air, is very much cooled by radiation (for example the arms may rotate with a velocity at their ends of about 600 feet per minute for a wheel of two feet in diameter, giving a centrifugal pressure equal to a column of water of about two feet), and special radiating provisions may be made to assist in this cooling of the parts.

Instead of conveying the oxygen or air through the arm of the motor, the centrifugal force may be utilized to supply the same under pressure by providing at or near the outer end of the arm an opening at the forward side, as shown in Fig. 5. In this case the forward end of the part L is open to the atmosphere and preferably provided with a flared air admission pipe N through which the air is forced under pressure by the rotation of the motor, and from which is passes directly to the valve. The combustible should be conveyed to the valve by the pipe C as in the previously described construction, and a solid arm O of any suitable construction and at any suitable point may connect the parts shown with the shaft.

The discharge of the burned gases may be modified according to the construction shown in Fig. 6, by providing suitable openings for the admission of air in advance of the outlet from the discharge nozzle F. These openings may be provided for example at a point just beyond the igniter by making the inner end of the nozzle F somewhat larger than the tube E, and connecting it to the end of the tube E by means of a spider so as to leave a substantially annular space through which the air will be sucked in the manner indicated by the arrows. This additional air will assist in the cooling of the combustion gases before their discharge from the nozzle, so that they will have the less energy after they are discharged. The increased mass of the combustion gases of the air tends to correspondingly increase the energy of the reaction. In this construction therefore a part of the energy of the combustion gases is utilized in the manner described for Fig. 1, and a part thereof in increasing their own mass.

It will be understood that the combustion gases escaping from the end of the pipe E will act in the manner of an injector to suck in air through the openings.

What I claim is:—

1. A reaction motor including in combination a flared discharge nozzle, an igniter in advance of said nozzle, a valve to which are supplied under pressure due to the force of rotation of the motor combustible and oxygen, a passage being provided between the valve and said igniter through which the supply of combustible and oxygen must pass in reaching the igniter, said valve being arranged to yield under the compression of the combustible and oxygen to permit the escape thereof into said passage, and to be closed by an explosion to prevent further escape thereof.

2. A reaction motor comprising an outwardly extending arm B having air admission holes near its inner end, a combustion tube C, a valve located near the outer end of said arm B and tube C and cutting off the flow therefrom, a tube E beyond said valve, an igniter G in the part of said tube opposite said valve, and a flared discharge nozzle F at the outer end of said tube E.

3. A reaction motor comprising an outwardly extending arm B having air admission holes near its inner end, a combustion tube C, a valve located near the outer end of said arm B and tube C and cutting off the flow therefrom, a tube E beyond said valve, an igniter G in the part of said tube opposite said valve, and a flared discharge nozzle F at the outer end of said tube E, said valve being arranged to press upon its seat with a greater pressure as the centrifugal force increases so as to tend to counterbalance the increased pressure of the combustible and air.

In witness whereof, I have hereunto signed my name in the presence of two subscribing witnesses.

PAUL LOUIS TOUSSAINT HÉROULT.

Witnesses:
D. ANTHONY USINA,
FRED WHITE.